INVENTORS
G.G. SEAMAN
J.A. TRENERRY
BY D.D. Gosben
ATTORNEY

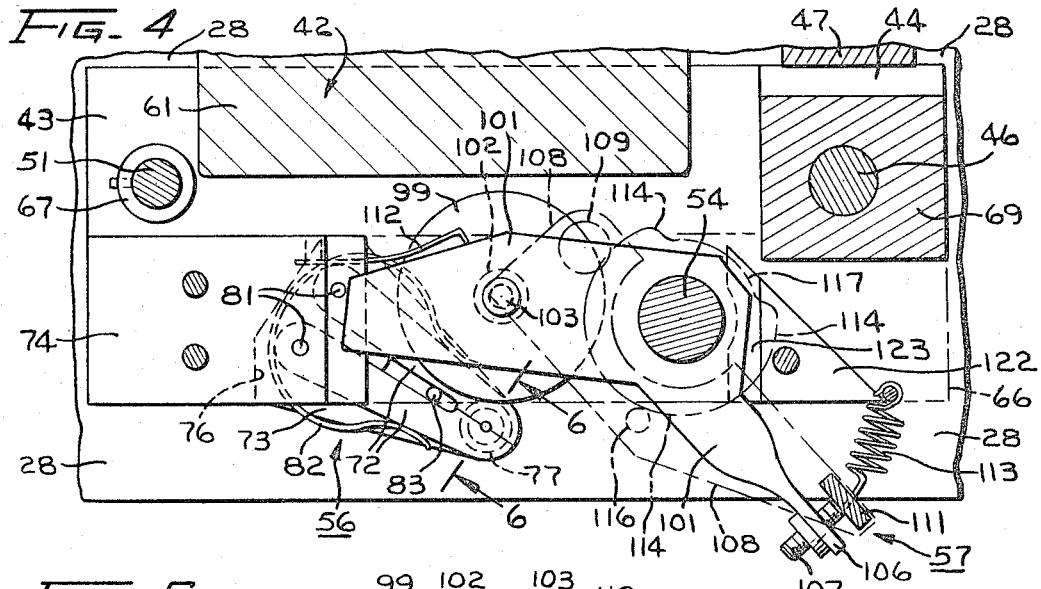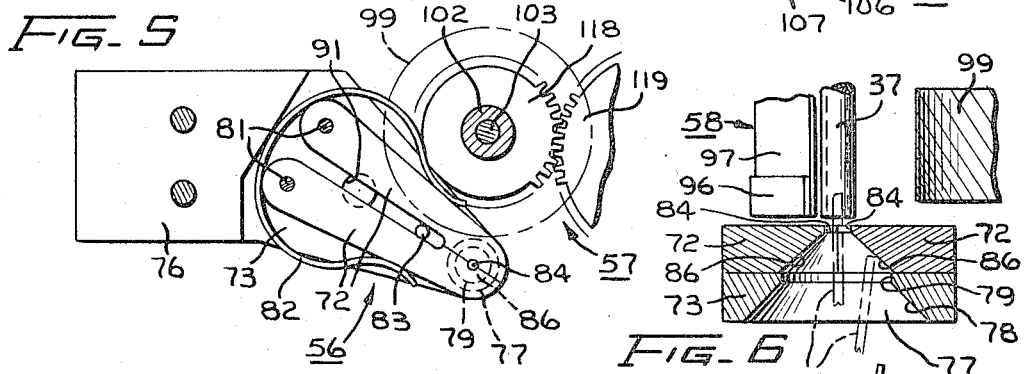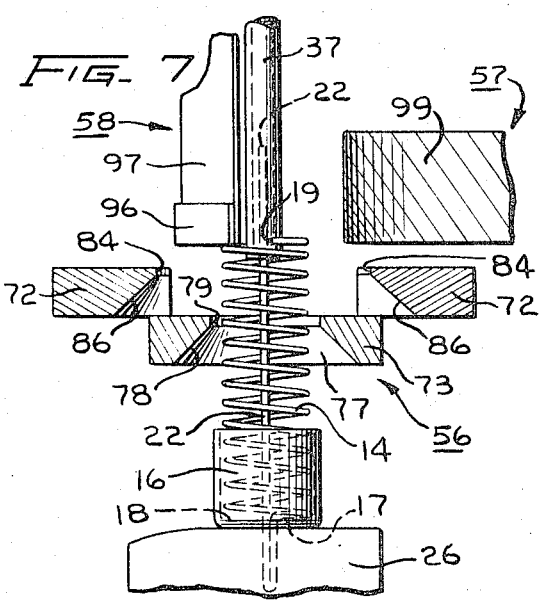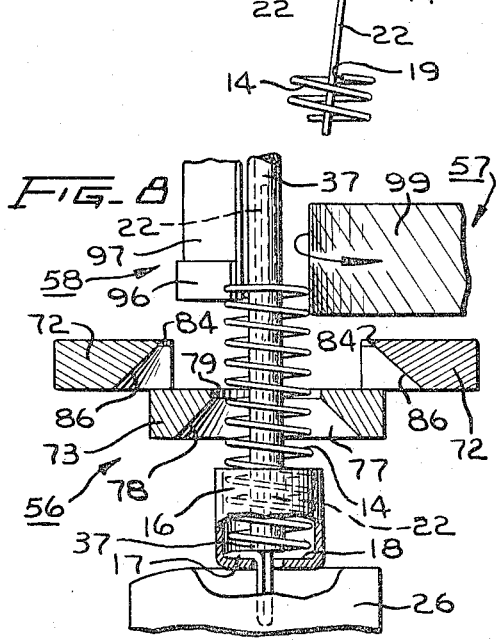

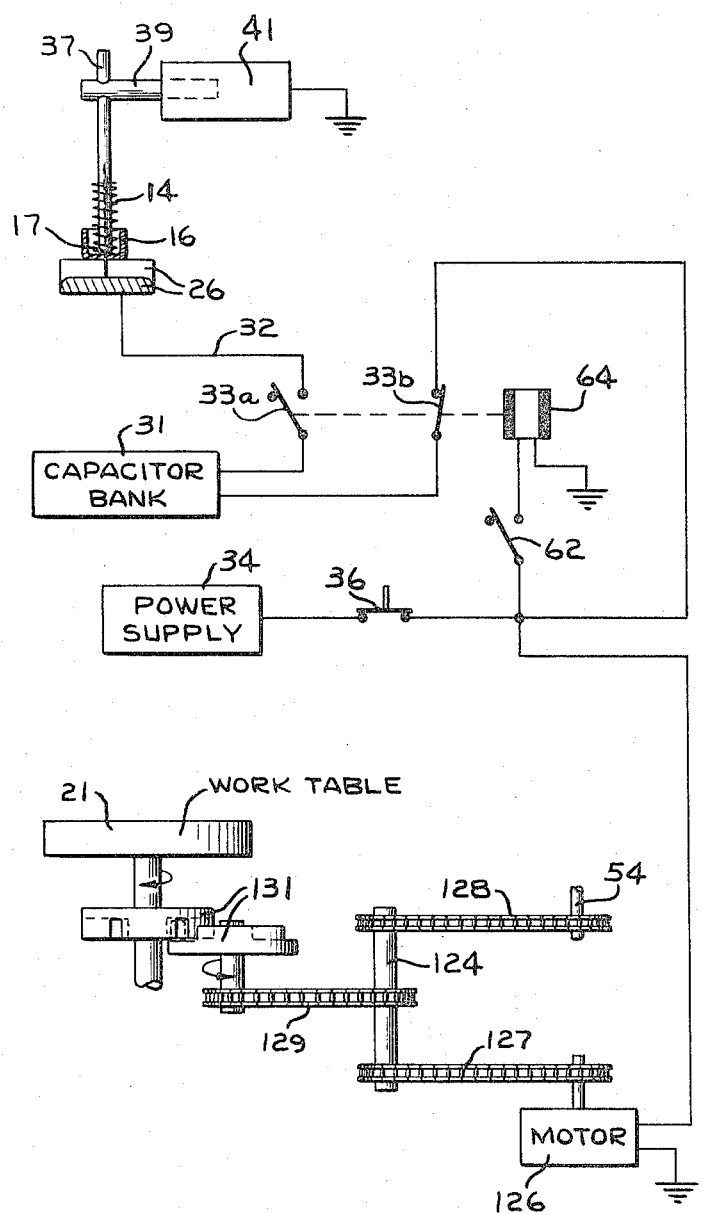

United States Patent Office 3,368,055
Patented Feb. 6, 1968

3,368,055
ARTICLE ASSEMBLING APPARATUS
Gary G. Seaman, Omaha, and James A. Trenerry, Millard, Nebr., assignors to Western Electric Company, Incorporated, New York, N.Y., a corporation of New York
Filed Feb. 12, 1965, Ser. No. 432,213
11 Claims. (Cl. 219—80)

ABSTRACT OF THE DISCLOSURE

In apparatus for welding a coil spring to an article, as a tubular welding electrode is moved relative to a support for the coil spring and the article, a guide mechanism guides an axially extending portion of the spring into the tubular electrode and guides the coils of the spring into substantially axial alignment with the electrode. An orienting mechanism then orients the coil spring about its longitudinal axis to locate it in a desired orientation with respect to the article. Subsequently, the tubular electrode engages a radially extending portion of the oriented coil spring adjacent its lower end to weld the portion to the article.

---

This invention relates to article assembling apparatus, and more particularly to apparatus for assembling a substantially cylindrical article to a second article. It is an object of this invention to provide new and improved apparatus of this character.

Certain electrical fuse assemblies used extensively in telephone switching equipment each include a coil spring having a portion extending radially inward from an end coil at one end of the spring, and an elongated portion which extends from adjacent the radially extending portion axially through the coils of the spring beyond its opposite end. The radially and axially extending portions are connected by a reverse wire loop portion integral therewith and projecting axially relative to the coils of the spring beyond the one end thereof through an aperture in an end wall of a tubular cap member in which the coils adjacent the one end of the spring are received with the end coil at the one end of the spring seated against the end wall. In the manufacture of these fuse assemblies, it is necessary that the one end of the coil spring be secured to the tubular cap member.

Heretofore, the securing of the coil spring to the cap member has been accomplished manually, by positioning the cap member over the one end of the coil spring, with the reverse wire loop portion of the spring projecting upward through the aperture in the end wall of the cap member. The cap member then is heated with a soldering iron and the end of a supply of solder is applied to the cap member adjacent the end wall aperture so that a small amount of the solder melts and flows through the aperture by capillary action, into the interior of the cap member and about the radially extending portion of the spring. Upon removal of the soldering iron from the cap member, the melted solder solidifies inside the cap member so that the end of the coil spring is secured to the cap member.

The foregoing procedure is undesirable primarily because the securing operation is relatively slow and time consuming. In addition, the procedure is undesirable in that it requires a certain amount of skill on the part of an operator, since unless only a specified amount of solder is permitted to flow through the aperture in the cap member end wall, the completed fuse assembly may be defective. For example, if an excessive amount of solder is permitted to flow through the aperture, the solder tends to flow about the coils of the spring adjacent its one end. Thus, in the completed fuse assembly, in which the coil spring is in a compressed state, these coils of the spring cannot be compressed, resulting in their being inoperative and in a fuse assembly which may be too long to meet length requirements. On the other hand, the permitting of insufficient solder to flow through the aperture in the end wall of the cap member may result in a completed fuse assembly having a weak connection between the coil spring and the cap member.

While the foregoing procedure is undesirable, the securing of the coil spring to the cap member other than by this procedure is difficult to accomplish for various reasons. For example, the radially extending portion of the coil spring at its one end is not readily accessible from the opposite end of the spring because of the spring's relatively long length and small diameter, and because of the axially extending portion of the spring. Further, the coils of the spring are formed of relatively thin copper alloy wire having a diameter on the order of sixteen thousandths of an inch, and thus are flexible and easily deformed.

Accordingly, another object of this invention is to provide new and improved apparatus for welding one end of a cylindrical article to a tubular cap member in which the one end of the cylindrical article is seated, wherein the cylindrical article includes a portion which extends radially inward from the one end thereof and which is to be welded to the cap member, and further includes a portion extending from the radially extending portion axially through the cylindrical article beyond the other end thereof.

A further object of this invention is to provide new an improved apparatus for welding a projecting portion of a first element to a second element, wherein the portion of the first element may be projecting therefrom in any one of a plurality of different positions in a plane which intersects the first element.

A still further object of this invention is to provide new and improved apparatus for welding a substantially cylindrical article to a second article in a desired orientation with respect to the second article.

Another object of this invention is to provide new and improved apparatus for orienting a coil spring about its longitudinal axis with respect to a second article.

A further object of this invention is to provide a new and improved guide mechanism for guiding an axially extending portion of a cylindrical article into a tubular member, and for locating a main body portion of the cylindrical article in substantially axial alignment with the tubular member.

Apparatus for carrying out the invention may include a welding mechanism for welding a first portion of a coil spring to an article, wherein the first portion extends radially inward with respect to the coils of the spring adjacent a first end of the coils, and wherein the spring includes a second portion extending from the first portion axially through the coils of the spring beyond a second and opposite end of the coils. As relative movement is caused between a tubular welding member of the welding mechanism, and a support for the coil spring and the article, a guide mechanism guides the axially extending second portion of the spring into the tubular welding member, and guides the coils of the coil spring into substantially axial alignment with the welding member. An orienting mechanism then orients the coil spring about its longitudinal axis to locate it in a desired orientation with respect to the article. Subsequently, the tubular welding member engages the radially extending first portion of the oriented coil spring to weld the portion to the article.

More specificially, in a preferred embodiment of the invention, the coil spring and the article are moved into and out of welding position by an indexing mechanism, and the article and the radially extending first portion of the coil spring, when in welding position, are in contact with one another and electrically connected to a first electrode.

With the coil spring and the article in welding position, as relative movement is caused between the indexing mechanism and a tubular electrode, a guide mechanism guides the axially extending portion of the coil spring into the tubular electrode and guides the coils of the spring into substantially axial alignment with the tubular electrode. Then, as a result of relative movement between the indexing mechanism and a stop member in a direction extending substantially parallel to the longitudinal axis of the coil spring, a first surface portion of the stop member engages the end coil of the spring at the second end of its coils. A mechanism then rotates the coil spring about its longitudinal axis until an extremity of the end coil comes into engagement with a second surface portion of the stop member to limit the rotation of the spring and to locate the extremity of the end coil, and thus the spring, in a desired position relative to the article.

Further relative movement between the indexing mechanism and the tubular electrode then causes the tubular electrode to contact the radially extending portion of the positioned coil spring to weld the portion to the article. After the welding operation is completed, relative movement is caused between the tubular electrode and the indexing mechanism, and between the stop member and the indexing mechanism in a second direction opposite to the first direction, so that the indexing mechanism can move the welded coil spring and article out of welding position.

The invention, together with further objects and advantages thereof, will best be understood by reference to the following detailed description taken in connection with the accompanying drawings, in which:

FIG. 4 is a partial, enlarged cross-sectional view taken substantially along the line 4—4 of FIG. 1;

FIG. 5 is a partial, enlarged cross-sectional view taken substantially along the line 5—5 of FIG. 1;

FIG. 6 is a partial, further enlarged, cross sectional view, taken substantially along the line 6—6 of FIG. 4 and illustrating certain operating phases of the apparatus;

FIG. 7 is a cross-sectional view similar to FIG. 6, but illustrating certain subsequent operating phases of the apparatus;

FIG. 8 is a cross-sectional view similar to FIGS. 6 and 7, but illustrating subsequent operating phases of the apparatus, including the operating position of FIG. 3;

FIG. 10 is a schematic diagram of an electrical circuit and drive arrangement for the apparatus.

Referring to FIG. 8 of the drawings, it is seen that the illustrated embodiment of the invention is designed to weld a cylindrical article in the form of a coil spring 14 to a tubular cap member 16 in which the coil spring is seated. Subsequently, the welded spring and cap assembly 14, 16 is subjected to additional processing and is combined with other parts in operation forming no part of this invention, to form an electrical fuse assembly used extensively in telephone switching systems.

Figure 2:
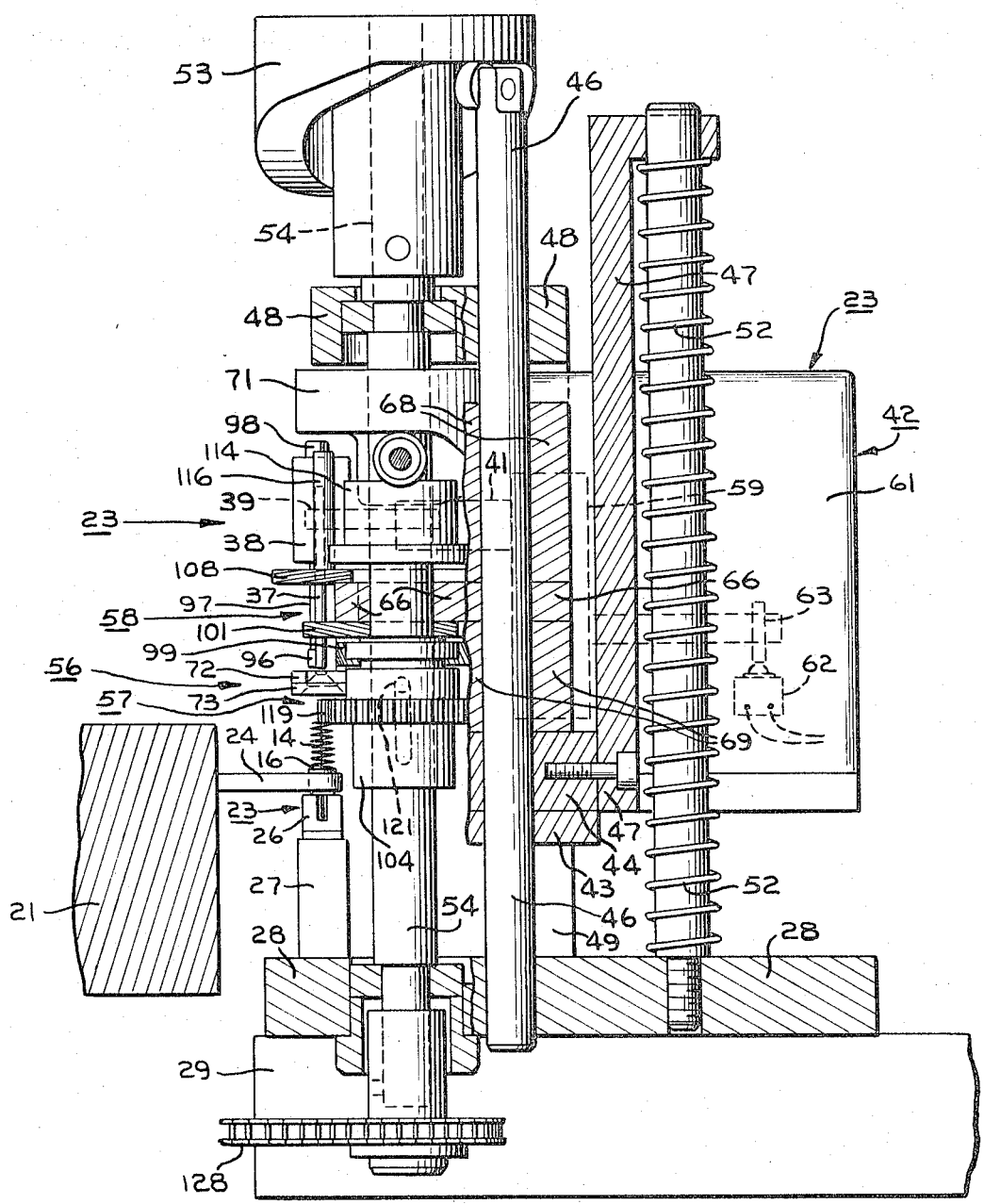
FIG. 2 is a dual plane, cross-sectional view of the apparatus, respective portions of which are taken substantially along the lines 2A—2A and 2B—2B of FIG. 1.

More specifically, as viewed in FIG. 8, the coil spring 14 includes a portion 17 which extends radially inward with respect to coils or a main body thereof, from an extremity or end element of the lower end coil thereof, and the apparatus is designed to weld the portion 17 to an end wall inner surface or element 18 of the cap member, after having oriented the coil spring about its vertical, longitudinal axis to locate an extremity 19 (FIG. 7) of an upper end coil of the spring in a desired position relative to the cap member and an indexing rotatable work table 21 (FIGS. 2 and 10). The coil spring 14 also includes an elongated portion or element 22 which extends from adjacent the radially extending portion 17 axially upward through the coils of the spring beyond the upper end coil of the spring. The radially and axially extending portions 17 and 22 are integrally connected by a reverse wire loop portion of the spring which projects through an aperture in the end wall of the tubular cap members 16, as best shown in FIG. 8. Thus, while the portion 17 of the coil spring 14 projects radially inward as an integral part of the lower end coil of the spring, it also projects radially outward as an integral part of the axially extending portion 22 of the spring.

Figure 1:
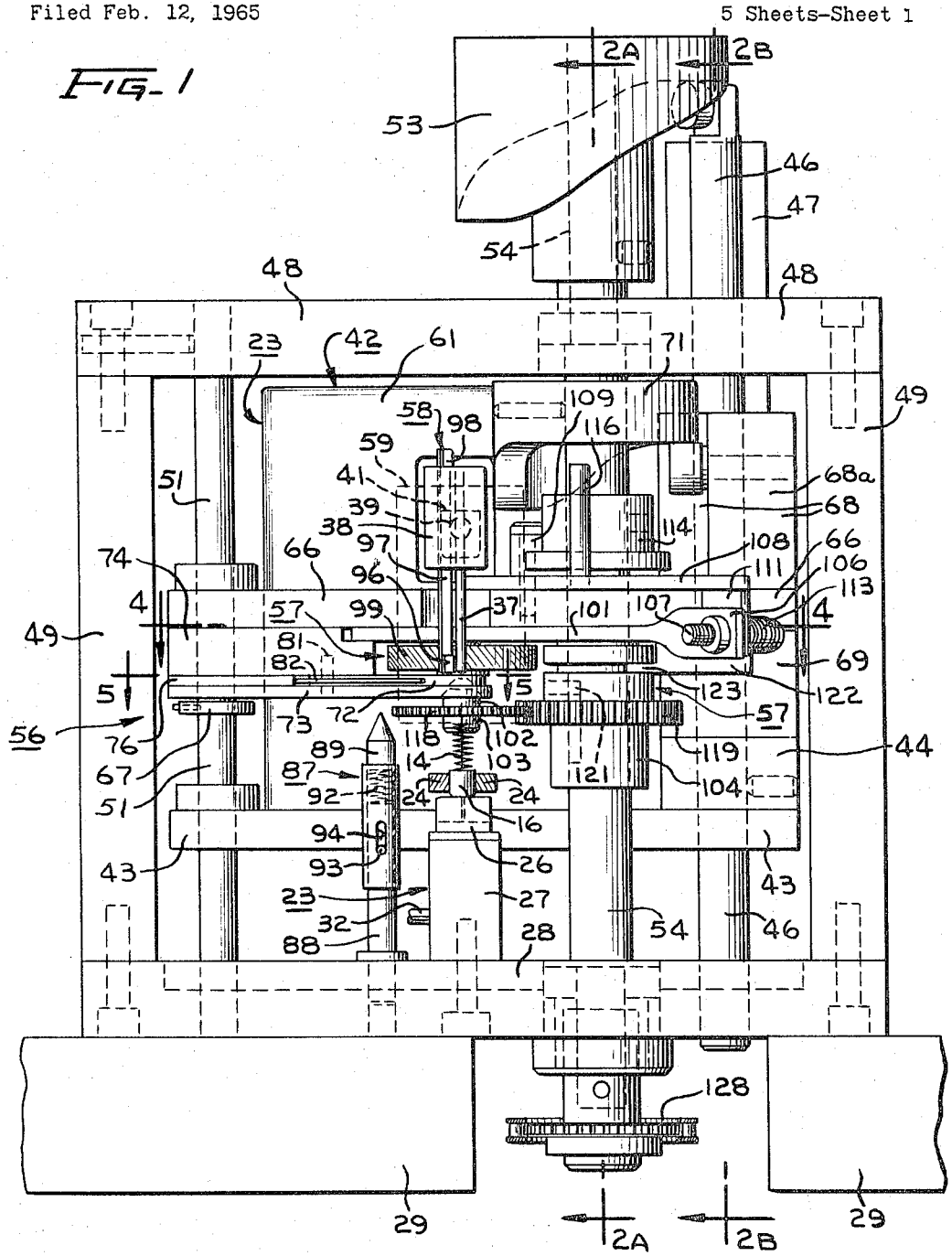
FIG. 1 is a front elevational view of the apparatus in a first operating position.
Figure 3:
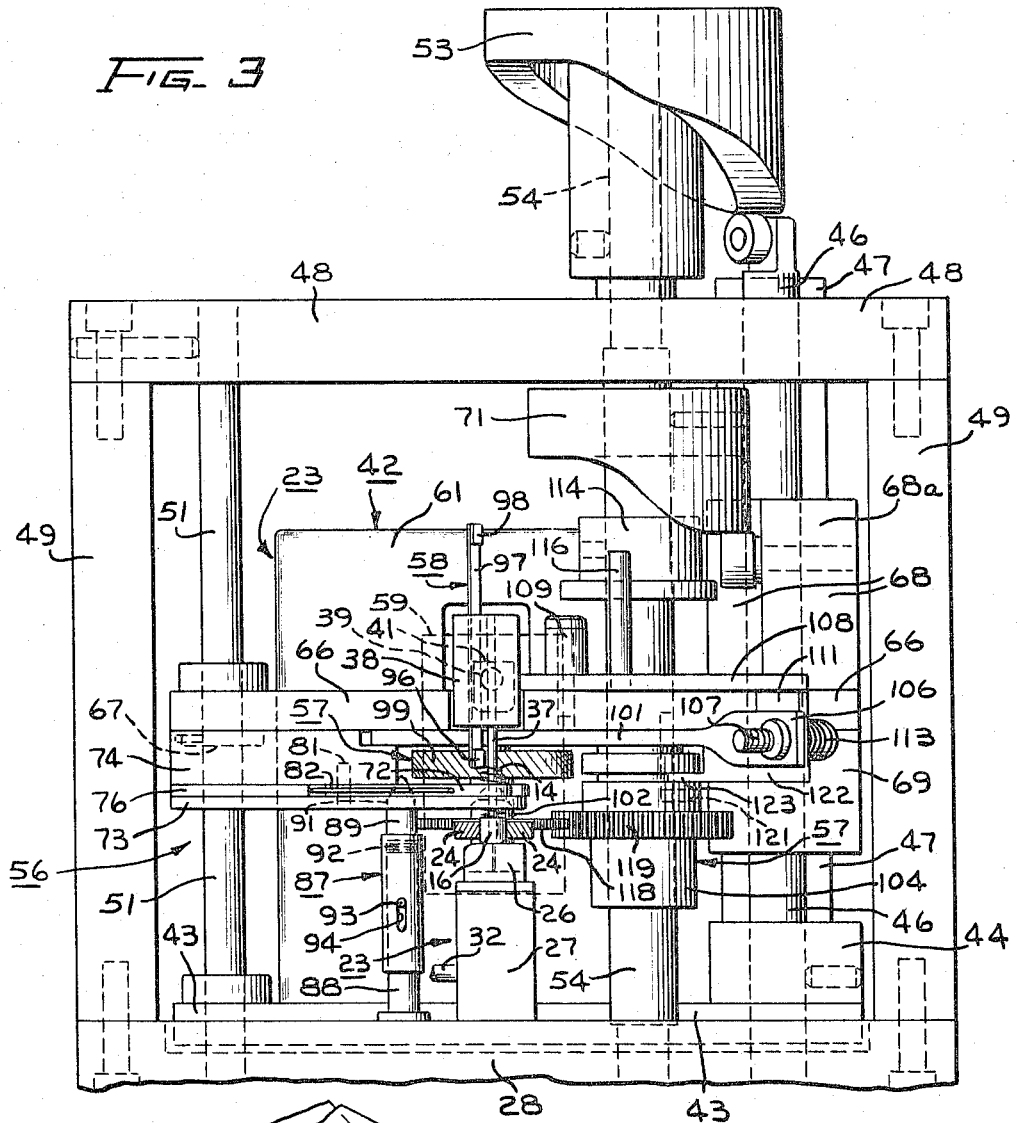
FIG. 3 is a partial front elevational view similar to FIG. 1, showing the apparatus in a second operating position.

Referring to FIGS. 1, 2 and 3, it is seen that successive spring and cap assemblies 14, 16 are moved from left to right, as viewed in FIGS. 1 and 3, into a welding position relative to a welding mechanism 23 of the apparatus by the indexing of the work table 21. The indexing of the work table 21 also moves each welded spring and cap assembly 14, 16 out of welding position after a welding operation, to subsequent stations for additional processing operations.

The work table 21, which may be of any suitable type, includes a plurality of pairs of gripping jaws 24 (only one pair being shown) for gripping the cap members 16 of the spring and cap assemblies 14, 16 firmly so as to hold the welded spring and cap assemblies against rotation therein. Thus, the position in which the extremity or termination 19 (FIG. 7) of the upper end coil of the coil spring 14 is located as a result of the orienting function of the apparatus, will be maintained as each welded spring and cap assembly 14, 16 is indexed by the work table, so that the termination of the end coil will be properly presented to a welding device at a subsequent station (not shown) for welding of the end coil to one of the other above-mentioned parts of the fuse assembly. Preferably, at least one of the jaws in each of the pairs of jaws 24 is spring biased toward a closed position to permit ready insertion and removal of the spring and cap assembly 14, 16 from the pair of jaws.

As the work table 21 moves each spring and cap assembly 14, 16 into welding position for a welding operation, the cap member 16 is moved onto a lower electrode 26 of the welding mechanism 23 and the reverse wire portion of the coil spring 14 is moved into a through slot in the electrode. The lower electrode 26, which may be of any suitable electrically conducting material, such as copper, is supported on the upper end of a vertically extending member 27 of a suitable insulating material, such as plastic, the member 27 having its lower end fixedly secured to a horizontally extending base member 28 on a support table 29. The lower electrode 26 is arranged to be alternately connected to, and disconnected from, an electrical power source, such as a bank of capacitors 31 (FIG. 10). For example, in the illustrated embodiment of the invention, a cable 32, which extends within the electrode support 27 for connection to the lower electrode 26, also is connected to a normally open contact 33a (FIG. 10) between the electrode and the bank of capacitors 31. The bank of capacitors 31 is connectable to a power supply 34 (FIG. 10) by a normally closed contact 33b and a manually operable control switch 36.

When the spring and cap assembly 14, 16 is in welding position on the lower electrode 26, the axially extending portion 22 of the spring is substantially vertically beneath an upper, vertically extending, tubular electrode 37 of the welding mechanism 23, in which tubular electrode the axially extending portion is received during the welding operation. The upper portion of the tubular electrode 37 extends through a block 38 of a suitable insulating material, such as plastic, and through an aperture in an outer end portion of a horizontally extending electrode holder 39, the insulating block being mounted on the outer end portion of the electrode holder. The upper tubular electrode 37 is removably secured in the insulating block 38 and the aperture in the electrode holder 39 in electrical contact with the holder in any suitable manner, such as by a set screw (not shown). The other inner end of the electrode holder 39 is mounted in a clamp 41 forming a part of a commercial welding head 42. The upper tubular electrode 37, its holder 39 and the clamp 41 may be of any suitable electrically conducting material, such as brass.

The welding head 42 of the welding mechanism 23 is carried on the top of a horizontally extending, vertically movable platform 43 which adjacent its right-hand side, as viewed in FIG. 1, also has an upwardly projecting block member 44 fixedly mounted thereon. The block member 44 is fixedly connected by a set screw to a vertically movable drive rod 46, and as is shown in FIG. 2, also is fixedly connected to the lower end portion of a vertically extending member 47. The drive rod 46 is mounted for vertical sliding movement adjacent its upper and lower ends in apertures in an upper horizontally extending frame member 48 and the base member 28, respectively. As is shown in FIG. 1, the opposite ends of the upper frame member 48 are secured to the upper ends of vertically extending side frame members 49 having their lower ends secured to the base member 28. Adjacent its left-hand side, as viewed in FIG. 1, the platform 43 receives a vertically extending guide rod 51 therethrough for vertical sliding movement on the rod, the upper end and lower ends of the guide rod being fixedly mounted in apertures in the upper frame member 48 and the base member 28, respectively.

The assembly formed by the upper tubular electrode 37, the insulating block 38, the electrode holder 39, the clamp 41, the welding head 42, the platform 43, the block member 44, the drive rod 46 and the vertical member 47, hereinafter referred to as the upper welding assembly 37–47, is biased upward into an upper retracted position, as shown in FIGS. 1 and 2, by a coil spring 52 (FIG. 2) positioned between the base member 28 and a laterally projecting flange at the upper end of the vertical member 47, and is movable downward to a welding position, as shown in FIG. 3, by a cam 53 fixedly mounted on a vertically extending rotatable drive shaft 54 and engaged with a cam follower on the upper end of the drive rod 46. As the cam 53 moves the upper welding assembly 37–47 vertically downward, the axially extending portion 22 of the coil spring 14 is guided into the tubular electrode 37 of the assembly, and the coils of the spring are guided into vertical axial alignment with the tubular electrode, by a vertically movable guide mechanism 56. Subsequently, the above-mentioned orienting of the coil spring 14 about its longitudinal vertical axis to locate the extremity 19 of its upper end coil in the desired position relative to the cap member 16 and the work table 21, is accomplished by an orienting mechanism including a spring rotating mechanism 57 and a stop assembly 58, the stop assembly being carried on the insulating block 38 of the upper welding assembly 37–47. Finally, the uper tubular electrode 37 engages and applies pressure to the radially extending portion 17 (FIG. 8) of the coil spring 14, for welding the portion to the cap member surface 18.

The welding head 42 preferably is a resistance type welding device in which the upper tubular electrode 37 and its holder 39 are mounted so as to eliminate transverse wiping action or side motion of the tubular electrode upon its engaging the radially extending portion 17 of the coil spring 14 and applying pressure thereto during the welding operation. For example, favorable results have been achieved with the Model 1032C welding head manufactured by the Weldmatic Division of the Unitek Corporation of Monrovia, Calif. certain pertinent parts of which, including the clamp 41, are illustrated schematically in FIGS. 1, 2 and 3. In this welding head as applied to the subject apparatus, the clamp 41 is carried on a slide member 59 mounted for vertical linear movement in a housing 61 and biased downward by an adjustable coil spring (not shown), with the clamp projecting from the slide through a vertical slot in the housing. As the welding head 42 is moved downward, the upper tubular electrode 37 engages and exerts pressure on the radially extending portion 17 of the coil spring 14 until this pressure equals the pressure being exerted by the slide biasing spring on the slide 59, whereupon the housing 61 moves downward relative to the tubular electrode, the electrode holder 39, the clamp 41 and the slide 59. This causes a microswitch 62 (FIGS. 2 and 10), mounted for movement with the housing 61, to be moved downward away from an operating member 63, which is fixedly mounted on the slide 59 and which normally holds contacts of the microswitch open, such that the contacts of the microswitch close.

As is shown in FIG. 10, in the illustrated embodiment of the invention the closing of the microswitch 62 energizes a relay 64 which opens the normally closed contact 33b and closes the normally open contact 33a. Thus, the bank of capacitors 31 is disconnected temporarily from the power supply 34, and is connected to discharge through the lower electrode 26, the end wall of the cap member 16, the radially extending portion 17 of the coil spring 14, the upper tubular electrode 37, the electrode holder 39, and the clamp 41, which is connected to ground, thereby to weld the radially extending portion to the end wall surface 18 of the cap member. When the upper welding assembly 37–47 subsequently is moved upward to its retracted position (FIGS. 1 and 2) under the action of the coil return spring 52 (FIG. 2), the biasing spring of the slide 59 returns it to its normal position relative to the housing 61 so that the microswitch 62 is reopened by the operating member 63. The reopening of the microswitch 62 deenergizes the relay 64 to open the contact 33a, and to close the contact 33b to reconnect the power supply 34 back to the bank of capacitors 31 to recharge the capacitors for the next welding operation.

Figure 9:
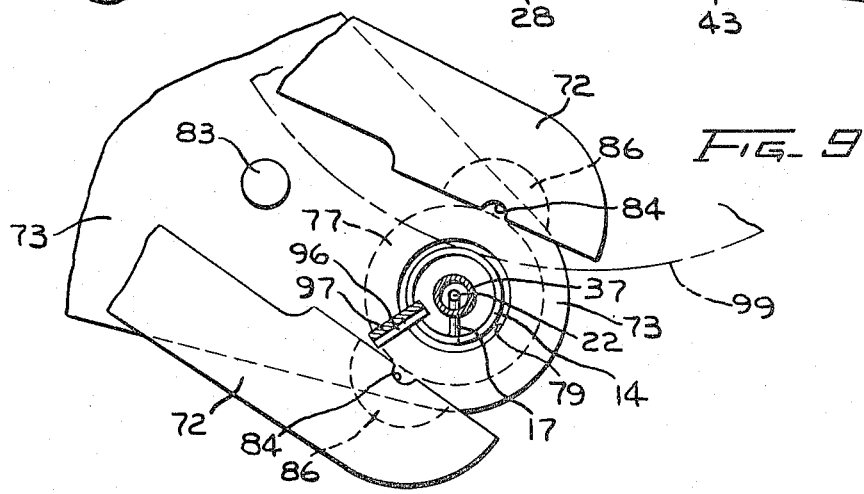
FIG. 9 is a partial plan view of the apparatus as it appears in FIG 8.

As is best shown in FIGS. 8 and 9, the internal bore of the upper tubular electrode 37 is substantially larger in diameter than the diameter of the axially extending portion 22 of the coil spring 14. Thus, as the tubular electrode 37 is moved downward for a welding operation, the axially extending portion 22 is received freely within the tubular electrode so that there is substantially no electrical contact between the axially extending portion and the tubular electrode, whereby upon closing of the welding circuit as above-described, the axially extending portion does not become welded to the tubular electrode.

The guide mechanism 56 and the spring rotating mechanism 57 are carried on a horizontally extending, vertically movable support plate 66 for vertical movement therewith between an upper retracted position, as shown in FIGS. 1 and 2, and a lowermost position, as shown in FIG. 3, the lowermost position being determined by a stop collar 67 adjustably mounted on the guide rod 51. The support plate 66 adjacent its left-hand end, as viewed in FIGS. 1 and 3, is slidably mounted on the vertically extending guide rod 51, while adjacent its right-hand end, as viewed in these figures, the support plate is slidably mounted on the vertical drive shaft 54 and slidably receives the vertical drive rod 46 therethrough.

Adjacent the right-hand end of the support plate 66, as viewed in FIGS. 1 and 3, upper and lower block members 68 and 69 are welded or otherwise fixedly mounted on the top and bottom thereof, respectively, and also slidably receive the vertical drive rod 46 therethrough. When the apparatus is in the upper retracted position shown in FIG. 1, the lower block member 69 rests upon the upwardly projecting block member 44 on the platform 43 of the upper welding assembly 37–47, so that the support plate 66, and thus the guide mechanism 56 and the spring rotating mechanism 57 thereon, are supported by the platform 43 of the upper welding assembly. As the cam 53 on the drive shaft 54 moves the upper welding assembly 37–47 vertically downward, the support plate 66, and the guide and spring rotating mechanisms 56 and 57, also are moved vertically downward at the same rate as the upper welding assembly, from the position of FIG. 1 to the position of FIG. 3, by a cam 71 fixedly mounted on the drive shaft 54 for rotation therewith and engaged with a cam follower rotatably mounted on a forwardly projecting portion 68a of the upper block member 68.

During an initial portion of the downward movement of the upper welding assembly 37–47, the support plate 66, and the guide and spring rotating mechanisms 56 and 57, the axially extending portion 22 of the coil spring 14, in the event that the portion is not in true axial alignment with the upper tubular electrode 37, is guided into the tubular electrode by a pair of separable upper guide jaws 72 of the guide mechanism 56. Similarly, the coils of the coil spring 14 are guided into vertical axial alignment with the tubular electrode 37 by a lower guide member 73 of the guide mechanism.

More specifically, as viewed in FIGS. 3 and 4, the left-hand side of the lower guide member 73, a block member 74 of a suitable insulating material, such as phenol fiber, and a spacer member 76 between the guide member and the block member are fixedly mounted, as by screws, on the underside of the support plate 66. Adjacent its right-hand side, as viewed in FIGS. 3 and 4, the lower guide member 73 is provided with an aperture 77 having its center in vertical axial alignment with the upper tubular electrode 37. As is shown in FIGS. 6 and 7, the lower portion of the aperture 77 is defined by a conical surface portion 78 for guiding the coils of the coil spring 14 into an upper portion of the aperture defined by a cylindrical surface portion 79, to align the coils axially with the tubular electrode 37.

As is best shown in FIGS. 1, 4 and 5, the separable guide jaws 72 are pivotally mounted at adjacent ones of their ends on vertical pins 81 having their upper and lower ends force-fitted into apertures in the block member 74 and the lower guide member 73, respectively, with the guide jaws being disposed in a space provided between the block member and the lower guide member as a result of the spacer member 76. The other ends of the guide jaws 72 are biased into engagement with one another by a substantially U-shaped clip spring 82 which has a bight portion thereof abutted against a vertical surface of the spacer member 76 and legs thereof in biasing engagement with respective ones of the guide jaws. The clip spring 82 also biases the guide jaws 72 against a locating pin 83 (FIGS. 4 and 5) fixedly mounted on the lower guide member 73 and projecting upward therefrom between the guide jaws.

Referring to FIGS. 5, 6 and 7, it is seen that each of the separable ends of the guide jaws 72 is provided with a semi-circular cylindrical surface portion 84 and a semi-circular tapered surface portion 86. When the guide jaws 72 are in a closed position in engagement with the locating pin 83, the cylindrical surface portions 84 define an aperture which is in vertical axial alignment with the upper tubular electrode 37, and the tapered surface portions 86 define a conically shaped guide for engaging and guiding the axially extending portion 22 of the coil spring 14 into the aperture, and subsequently into the internal bore in the tubular electrode.

A pin cam assembly 87 (FIGS. 1 and 3) projects upward from the base member 28 for separating the guide jaws 72 of the guide mechanism 56 after the guide jaws have guided the axially extending portion 22 of the coil spring 14 into the upper tubular electrode 37, so that, as is illustrated in FIG. 7, the coils of the coil spring can be received through the cylindrical aperture 77 in the lower guide member 73 and the guide mechanism 56 can move further downward relative to the coil spring. The pin cam assembly 87 includes a stud 88 having its lower end screw threaded into the base member 28, and a pin cam 89 having a lower tubular portion telescopically mounted on an upper portion of the stud for limited vertical movement relative thereto.

As the guide mechanism 56 is moved downward toward its lowermost position in FIGS. 3 and 8, the upper end of the pin cam 89 is received through an aperture 91 (FIGS. 3 and 5) in the lower guide member 73 and engages between the upper guide jaws 72. Initially, the pin cam 89 is moved downward by the guide jaws 72 relative to the stud 88 to compress a coil spring 92 between an upper interior end surface of the tubular portion of the pin cam and the top of the stud. After the cylindrical and tapered surface portions 84 and 86 of the guide jaws 72 have guided the axially extending portion 22 of the coil spring 14 into the tubular electrode 37, and at substantially the time that the upper end of the coil spring is ready to be received through the aperture 77 in the lower guide member 73, downward movement of the pin cam 89 relative to the stud 88 is stopped by a laterally projecting pin 93 on the stud engaging the upper end of a vertical slot 94 in the tubular portion of the pin cam. Then, as the guide mechanism 56 moves further downward into its lowermost position, the pin cam 89 separates the guide jaws 72, as shown in FIG. 7. After the above-described welding operation is completed and the apparatus is being returned to its uppermost position (FIG. 1), the pin cam 89, under the influence of its biasing spring 92, moves upward with the guide jaws 72 to retain them in an open position so that they do not reclose upon the upper coils of the coil spring 14. Subsequently, this upward movement of the pin cam 89 with the guide jaws 72 is stopped by the pin 93 engaging the lower end of the vertical slot 94 in the tubular portion of the pin cam, and the pin cam is withdrawn from between the guide jaws, whereupon the clip spring 82 biases them back into their closed position.

As is best shown in FIGS. 1 and 3, the stop assembly 58 of the above-mentioned orienting mechanism for the coil spring 14 includes a stop plate 96 secured to the lower end of an elongated rectangular member 97, the elongated member extending vertically parallel to the upper tubular electrode 37 through the insulating block 38 so as to be slidable relative to the block. The elongated member 97 is retained in the insulating block 38 by a retaining plate 98 secured to the elongated member at its upper end.

As the upper welding assembly 37–47 is being moved downward relative to the coil spring 14 by the cam 53, referring to FIG. 7, it is seen that a horizontally extending bottom surface of the stop plate 96 comes into engagement with an upwardly facing surface portion of the upper end coil of the spring. After the guide mechanism 56 has reached its lowermost position as shown in FIG. 8, a continuously rotating orienting roller 99 of the spring rotating mechanism 57 is moved into engagement with the upper coils of the coil spring 14 to rotate it about its vertical axis so that the extremity 19 of the upper end coil of the spring engages a vertically extending stop surface of the stop plate 96, to locate the extremity in the above-mentioned desired position relative to the cap member 16, which is being firmly held against rotation in the gripping jaws 24 of the indexing table 21. After the coil spring 14 has been thus oriented, the downwardly moving tubular electrode 37 engages the radially extending portion 17 of the spring to weld it to the cap member 16 as above described.

The mounting of the stop assembly 58 for vertical sliding or floating movement on the insulating block 38 is advantageous as compared to a fixedly mounted stop, since the stop assembly can engage coil springs 14 of different heights without unduly compressing springs having a relatively great height. In this regard, where the coils of the coil spring 14 are relatively flexible and easily deformed, as in the illustrated embodiment of the invention, since the spring supports the stop assembly 58 during a portion of the operating cycle of the apparatus, the stop assembly preferably is of relatively light construction. For example, the vertical rectangular member 97 may be of a light plastic material, with the stop plate 96 and the retaining plate 98 being of a light metal, such as aluminum.

Referring to FIGS. 1 and 4, it is seen that the orienting roller 99, which may have a corrugated periphery to increase the friction between the roller and the coil spring 14 during an orienting operation, is carried on a horizontally disposed angular support arm 101 adjacent one end of the arm. The mounting of the orienting roller 99 includes a sleeve 102 (FIGS. 1, 4 and 5) fixedly connected thereto and depending axially downward therefrom, the roller and the sleeve being rotatable on a vertical pin 103 which extends axially through the sleeve. The mounting pin 103 includes a head portion at its lower end upon which the lower end of the sleeve is supported, and the upper portion of the pin is screw threaded into the support arm 101, or is otherwise suitably secured thereto.

The support arm 101 receives the rotatable drive shaft 54 therethrough such that the arm is pivotable and vertically slidable relative to the drive shaft. In this regard, the support arm 101 is retained adjacent the underside of the vertically slidable support plate 66 so as to be movable vertically therewith relative to the drive shaft 54, by a cylindrical gear hub 104 (FIG. 1), described in further detail hereinbelow. The end of the roller support arm 101 opposite the end carrying the orienting roller 99 is twisted 90° to terminate in a vertically extending portion 106. An adjustment screw 107 is mounted in the vertically extending portion 106, and has a screw threaded locking member thereon for retaining the screw in a desired position in a well-known manner.

The support arm 101 for the orienting roller 99 is pivotable on the drive shaft 54 counterclockwise, as viewed in FIG. 4, to bring the roller into engagement with the coil spring 14 as shown in FIG. 8, by an operating mechanism including an operating arm 108. As is shown in FIGS. 1 and 2, the operating arm 108 rests upon the upper surface of the support plate 66 and is mounted adjacent its left-hand end, as viewed in FIG. 1, for pivotal movement by means of a vertically extending pin 109 having its lower end screw threaded into the support plate. Adjacent the other end of the operating arm 108 is a downwardly projecting portion 111, and the roller support arm 101 is biased counterclockwise, as viewed in FIG. 4, by a leaf-type spring 112 on the block member 74, so that the adjustment screw 107 carried by the support arm is continuously engaged against the downwardly projecting portion. The operating arm 108 also is biased counterclockwise, as viewed in FIG. 4, by a coil spring 113 connected between the downwardly projecting portion 111 and a pin on the support plate 66. By adjustment of the screw 107, the degree of travel of the orienting roller 99 as it moves to engage the coil spring 14 for an orienting operation, and thus the pressure that it exerts on the spring, can be varied as desired.

Referring to FIGS. 1-4, it is seen that the orienting roller 99 is held out of its spring-orienting position by a cam 114 secured to the drive shaft 54 for rotation therewith and having a camming surface continuously engaged with a vertically extending cam follower pin 116 having its lower end fixed to the roller operating arm 108. As is best shown in FIG. 4, the camming surface of the cam 114 includes a reduced portion 117 which, upon the cam follower pin 116 coming into engagement therewith, permits the springs 112 and 113 to pivot the operating arm 108 and the roller support arm 101 counterclockwise, as viewed in this figure, to bring the orienting roller 99 into engagement with the periphery of the coil spring 14 as above described.

The continuous rotation of the orienting roller 99 is accomplished by a drive mechanism including a toothed gear 118 (FIGS. 1, 3 and 5) fixedly mounted on the lower end of the roller carrying sleeve 102 and meshing with a second toothed gear 119. The gear 119 is fixedly mounted on the cylindrical gear hub 104, which receives the drive shaft 54 therethrough and which is mounted on the drive shaft for rotation therewith and vertical movement relative thereto by a pin member 121 mounted in the hub and projecting into a vertical slot in the drive shaft. The gear hub 104, which holds the roller carrying arm 101 adjacent the bottom of the vertically movable support plate 66, is connected to the support plate for movement therewith by a bracket 122 (FIGS. 1, 3 and 4). The bracket 122 is secured to the underside of the support plate 66 by one or more screws and includes a horizontally extending flange 123 which is received in a circumferentially extending groove in the gear hub 104 so as to retain the hub in a fixed vertical position relative to the support plate, and still permit rotation of the hub relative to the bracket and the support plate.

The indexing of the work table 21 to move the spring and cap assembly 14, 16 into and out of welding position, and the rotation of the drive shaft 54 for successive orienting and welding operations, may be synchronized in any suitable manner. For example, referring to FIG. 10, in the illustrated embodiment of the invention a main drive shaft 124 is driven by a motor 126 through a sprocket and chain drive 127, the motor being connected to the power supply 34 through the master control switch 36. The main drive shaft 124 drives the drive shaft 54 through another sprocket and chain drive 128. Similarly, the main drive shaft 124, through a sprocket and chain drive 129, drives a Geneva wheel 131 for intermittently indexing the work table 21 in timed relationship with respect to the rotation of the drive shaft 54, in a manner well known to those skilled in the art.

The construction of the upper electrode of the welding mechanism 23 in the form of a tube, as in the illustrated embodiment of the invention, is desirable for various reasons. For example, the upper tubular electrode 37, in cooperation with the guide mechanism 56, provides an arrangement in which the upper electrode can be moved through the coil spring 14 to weld the radially extending portion 17 of the spring to the cap member inner surface or element 18, without interference from the axially extending portion 22 of the spring. Further, the coil springs 14 are not necessarily uniform in construction and the radially extending portion 17 of each spring, including the extremity or the end element of its lower end coil, may be located on associated cap member surface 18 in any one of an infinite number of positions circumferentially about the axially extending portion or element 22. Thus, the tubular construction of the upper electrode 37, whereby it encircles the axially extending portion 22 of the coil spring 14 between the axially extending portion and the extremity of its lower end coil during a welding operation, insures that the electrode will engage the radially extending portion 17 regardless of its position on the cap member surface 18.

*Operation*

In operation, the control switch 36 is closed, as shown in FIG. 10, and the motor 126 continuously rotates the drive shaft 54 and drives the Geneva wheel 131 through the main drive shaft 124 and the sprocket and chain drives 127, 128 and 129. At the beginning of a cycle, the apparatus is in its upper retracted position shown in FIGS. 1 and 2, and the work table 21 is indexed by the Geneva wheel 131 from left to right, as viewed in FIG. 1, to move a spring and cap assembly 14, 16 in one of the pairs of jaws 24 (only one pair shown) of the work table into a welding position in which the cap member 16 rests on the lower electrode 26, and in which the axially extending portion 22 of the coil spring 14 is substantially vertically beneath the upper tubular electrode 37.

The cam 53 on the rotating drive shaft 54 then moves the upper welding assembly 37–47, including the stop assembly 58 on the insulating block 38, vertically downward toward the welding position thereof shown in FIG. 3. During this downward movement of the upper welding assembly 37–47, the support plate 66, and the guide mechanism 56 and the spring rotating mechanism 57 thereon, are moved vertically downward at the same rate toward the position thereof shown in FIG. 3, by the cam 71 on the drive shaft 54.

During an initial portion of the foregoing downward movement, the upper end of the axially extending portion 22 of the coil spring 14, in the event that the portion is not in axial alignment with the upper tubular electrode 37 of the welding assembly 37–47, is guided into the upper tubular electrode by the semi-circular surface portions 84 and 86 (FIG. 6) of the separable guide jaws 72 of the guide mechanism 56. Similarly, the upper end coil of the coil spring 14, in the event that the coils of the spring are not in vertical axial alignment with the tubular electrode 37, is guided by the conical surface 78 of the lower guide member 73 toward the cylindrical surface portion 79 of the guide member.

As the guide mechanism 56 is moving vertically downward, the upper tapered end of the pin cam 89 moves through the aperture 91 (FIGS. 3 and 5) in the lower guide member 73 and engages between the separable guide jaws 72. However, initially the guide jaws 72 move the pin cam 89 vertically downward therewith relative to the stud 88 to compress the coil spring 92 between the pin cam and the stud. Just before the upper end coil of the coil spring 14 is about to enter the cylindrical portion 79 of the aperture 77 in the lower guide member 73, the limiting pin 93 on the stud 88 engages the upper end of the slot 94 in the tubular portion of the pin cam 89 to arrest its downward movement. Then, upon continued downward movement of the guide mechanism 56, the pin cam 89 separates the guide jaws 72, as is illustrated in FIG. 7, so that the upper coils of the coil spring 14 can pass through the aperture 77 in the lower guide member 73 and the guide mechanism 56 can move further downward to its lowermost position, as shown in FIGS. 3 and 8.

After the axially extending portion 22 of the coil spring 14 has entered the upper tubular electrode 37 and the upper coils of the coil spring 14 have passed through the cylindrical aperture 77 in the lower guide member 73, referring to FIG. 7, it is seen that the bottom surface of the stop plate 96 of the stop assembly 58 comes into engagement with an upper surface portion of the upper end coil of the coil spring. The cam follower pin 116 on the roller operating arm 108 of the spring rotating mechanism 57 is engaged by the reduced portion 117 (FIG. 4) of the camming surface of the rotating cam 114, so that the leaf spring 112 and the coil spring 113 can pivot the operating arm and the roller support arm 101 counterclockwise, as viewed in FIG. 4, to bring the periphery of the orienting roller 99 into engagement with the upper coils of the coil spring 14 as shown in FIG. 8. The orienting roller 99, which is being continuously driven by the gears 118 and 119 from the drive shaft 54, then rotates the coil spring 14 about its vertical longitudinal axis to bring the extremity 19 (FIG. 7) of the upper end coil into engagement with the vertical front face of the stop plate 96, as shown in FIG. 8, thereby to locate the upper end coil in the desired position relative to the cap member 16 and the work table 21 for the above-mentioned welding operation at a subsequent station. After the termination 19 of the upper end coil engages the vertical stop face of the stop plate 96 the rotating roller 99 slips relative to the upper coils of the coil spring until the roller is moved away from the spring clockwise, as viewed in FIG. 4, by the cam 114.

Referring to FIG. 3, it is seen that the downward movement of the support plate 66, and of the guide mechanism 56 and the spring rotating mechanism 57 thereon, is limited by the bottom of the support plate engaging the stop collar 67 on the vertical guide rod 51. The upper welding assembly 37–47, however, continues to be moved downward by the cam 53 so that, as is shown in FIG. 8, the lower end of the upper tubular electrode 37 engages and exerts pressure on the radially extending portion 17 of the coil spring 14. When this pressure equals the pressure being exerted on the slide 59 of the welding head 42 by the slide's biasing spring (not shown), the housing 61 and the microswitch 62 of the welding head move downward relative to the slide and the operating member 63 carried thereby so that the microswitch contacts close to energize the relay 64 (FIG. 10).

The energized relay 64 opens the contact 33b to disconnect the bank of capacitors 31 from the power supply 34, and closes the contact 33a to connect the capacitors to the lower electrode 26 through the cable 32. The bank of capacitors 31 then discharges through the cable 32, the lower electrode 26, the end wall of the cap member 16, the radially extending portion 17 of the coil spring 14, the tubular electrode 37, the electrode holder 39 and the grounded clamp 41, to weld the radially extending portion to the end wall surface 18 of the cap member.

After the welding operation is completed the rotating cam 53 permits the coil return spring 52 (FIG. 2) to move the upper welding assembly 37–47 vertically upward back to the position in FIGS. 1 and 2. During this upward movement of the upper welding assembly 37–47, the upwardly projecting block member 44 thereof comes back into engagement with the downwardly projecting block member 69 on the support plate 66 so as to lift the support plate, including the guide mechanism 56 and the spring rotating mechanism 57 thereon, from the position shown in FIG. 3 back to the position shown in FIGS. 1 and 2. Similarly, the stop assembly 58 on the insulating block 38 of the upper welding assembly 37–47, upon the retaining plate 98 of the stop assembly being engaged by the insulating block, is moved vertically upward out of engagement with the coil spring 14 parallel to the vertical longitudinal axis of the spring so as not to damage its coils.

As the guide mechanism 56 initially moves upward, the pin cam 89 of the pin cam assembly 87 is moved upward with the guide mechanism and relative to the stud 88 by the coil spring 92, to retain the guide jaws 72 in an open position and to prevent them from closing upon the upper coils of the coil spring 14. Subsequently, the limiting pin 93 on the stud 88 engages the lower end of the vertical slot 94 in the tubular portion of the pin cam 89 to arrest the pin cam's upward movement. The guide mechanism 56 then moves upward relative to the pin cam 89 so that it is withdrawn from between the guide jaws 72, whereupon the jaws are moved back to their closed position against the locating pin 83 by the clip spring 82.

As the upper welding assembly 37–47 is moved back to its upper retracted position shown in FIG. 1, the biasing spring (not shown) for the slide 59 of the welding head 42 restores the slide to its normal position relative to the housing 61 of the welding head, so that the microswitch 62 is opened by the operating member 63 (FIG. 2) on the slide, thereby deenergizing the relay 64 (FIG. 10). This releases the contact 33a, and also releases the contact 33b so that it returns to its normal position, as shown in FIG. 10, to reconnect the bank of capacitors 31 back to the power supply 34 to recharge the capacitors for the next welding operation.

When the apparatus has been returned to the position thereof shown in FIGS. 1 and 2, the work table 21 is again indexed by the Geneva wheel 131 to move the welded spring and cap assembly 14, 16 to a subsequent station and to move a new spring and cap assembly 14, 16 into welding position, whereupon the above-described cycle of operation is repeated.

While one embodiment of the invention has been disclosed, many modifications will be apparent and it is intended that the invention be interpreted as including all modifications which fall within the true spirit and scope of the invention.

What is claimed is:

1. Apparatus for welding a substantially cylindrical article to a second article in a desired orientation with respect to the second article, which comprises:
    first and second electrodes;
    means for supporting the articles in welding position with a first portion of the cylindrical article and the second article in contact with one another and electrically connected to said first electrode;
    a rotatable member;
    means for moving said rotatable member into engagement with the periphery of the cylindrical article and for rotating said rotatable member to rotate the cylindrical article about its longitudinal axis relative to the second article;
    a stop member engageable with a second portion of the rotating cylindrical article to limit the rotation thereof and to locate the cylindrical article in the desired orientation with respect to the second article; and
    means for causing relative movement between said second electrode and said support means so that said second electrode contacts the first portion of the cylindrical article to weld the portion to the second article.

2. Apparatus for orienting a coil spring about its longitudinal axis with respect to an article, which comprises:
    means for supporting the coil spring and the article;
    a stop member including first and second surface portions inclined with respect to one another at a substantial angle;
    means for causing relative movement between said stop member and said support means in a direction extending substantially parallel to the longitudinal axis of the coil spring to bring the first surface portion of said stop member into engagement with an end coil of the coil spring; and
    means for rotating the coil spring about its longitudinal axis relative to the article and the first surface portion of said stop member so that an extremity of the end coil comes into engagement with the second surface portion of said stop member to limit the rotation of the coil spring and to locate the coil spring in a desired orientation with respect to the article.

3. Apparatus for welding a coil spring to an article in a desired orientation with respect to the article, which apparatus comprises:
    means for supporting the coil spring and the article in welding position with a portion of the coil spring and the article in contact with one another;
    a stop member including first and second surface portions inclined with respect to one another at a substantial angle;
    means for causing relative movement between said stop member and said support means in a first direction extending substantially parallel to the longitudinal axis of the coil spring to bring the first surface portion of said stop member into engagement with an end coil of the coil spring;
    means for rotating the coil spring about its longitudinal axis relative to the article and to the first surface portion of said stop member so that an extremity of the end coil comes into engagement with the second surface portion of said stop member to limit the rotation of the coil spring and to locate the coil spring in the desired orientation with respect to the article;
    means for welding the portion of the oriented coil spring to the article; and
    means for causing relative movement between said top member and said support means in a second direction opposite to the first direction, so that the welded coil spring and article can be removed from welding position without damaging the coils of the spring.

4. Apparatus for welding a projecting portion of a cylindrical article to a second article, wherein the portion may be projecting from the cylindrical article in any one of a plurality of different positions, which apparatus comprises:
    means for supporting the articles in welding position with the projecting portion of the cylindrical article and the second article in contact with one another;
    a welding mechanism including a welding member having a configuration substantially similar to the configuration of the cylindrical article so as to be engageable with the projecting portion of the cylindrical article to weld the portion to the second article;
    means for rotating the cylindrical article about its longitudinal axis relative to the second article;
    a stop member engageable with a portion of the rotating cylindrical article to limit the rotation thereof and to locate the cylindrical article in a desired orientation with respect to the second article; and
    means for causing relative movement between the welding member of said welding mechanism and said support means so that the welding member contacts the projecting portion of the cylindrical article to weld the projecting portion to the second article.

5. Apparatus for welding a projecting portion of a cylindrical article to a second article, wherein the portion may be projecting from the cylindrical article in any one of a plurality of different positions, as recited in claim 4, in which said welding mechanism includes first and second electrodes for welding the projecting portion of the cylindrical article to the second article, with the projecting portion and the second article being electrically connected to said first electrode when in their welding position, and with the welding member of said welding mechanism being said second electrode.

6. Apparatus for welding a first portion of a cylindrical article to a second article, wherein the first portion extends radially inward with respect to the cylindrical article adjacent one end of a main body thereof and the cylindrical article also includes a second portion extending from the radially extending first portion substantially along the longitudinal axis of the cylindrical article beyond the other end of the main body, which apparatus comprises:
    a first electrode;
    means for supporting the articles in welding position with the radially extending portion of the cylindrical article and the second article in contact with one another and electrically connected to said first electrode;
    a substantially tubular second electrode in which the axially extending portion of the cylindrical article is receivable with substantially no electrical contact between said tubular electrode and the axially extending portion, said tubular electrode being engageable with the radially extending portion of the cylindrical article to weld the radially extending portion to the second article;
    a stop member;
    means for rotating the cylindrical article about its longitudinal axis relative to the second article and to said stop member so that a portion of the cylindrical article engages said stop member to limit the rotation of the cylindrical article and to locate the cylindrical article in a desired orientation with respect to the second article;
    means for causing relative movement between said tubular electrode and said support means so that the axially extending portion of the cylindrical article is received in said tubular electrode and said tubular electrode contacts the radially extending portion of the oriented cylindrical article to weld the portion to the second article; and means for causing relative movement between said tubular electrode and said support means so that the welded articles can be removed from welding position.

7. Apparatus for welding a first portion of a cylindrical article to a second article, wherein the first portion extends radially inward with respect to the cylindrical article adjacent one end of a main body thereof and the cylindrical article includes a second portion extending from the first portion substantially along the longitudinal axis of the cylindrical article beyond the other end of the main body, as recited in claim 6, which further comprises:

a guide mechanism; and means for causing relative movement between said guide mechanism and said support means during the relative movement between said tubular electrode and said support means, so that said guide mechanism guides the axially extending portion of the cylindrical article into said tubular electrode and guides the main body of the cylindrical article into substantially axial alignment with said tubular electrode.

8. Apparatus for welding a first portion of a cylindrical article to a second article, wherein the first portion extends radially inward with respect to the cylindrical article adjacent one end of a main body thereof and the cylindrical article includes a second portion extending from the first portion substantially along the longitudinal axis of the cylindrical article beyond the other end of the main body, as recited in claim 17, in which said guide mechanism comprises:

a pair of separable guide jaws which, when in a closed position, define an apertured, conically shaped guide means for guiding the axially extending portion of the cylindrical article into said tubular electrode;

a guide member having an aperture for receiving the main body of the cylindrical article therethrough to locate the main body in substantially axial alignment with said tubular electrode;

a conical cylindrical surface on said guide member for guiding the main body of the cylindrical article through the aperture in said guide member; and means for separating said guide jaws after the axially extending portion of the cylindrical article has entered said tubular electrode, so that the main body of the cylindrical article can pass through the aperture in said guide member.

9. A guide mechanism, which comprises:

a pair of separable guide jaws which, when in a closed position, define an apertured, conically shaped guide means for guiding an axially extending portion of a cylindrical article into a tubular member as relative movement is caused between the guide mechanism and the cylindrical article in a first direction;

a guide member having an aperture for receiving a main body of the cylindrical article therethrough to locate the main body in substantially axial alignment with the tubular member as relative movement is caused between the guide mechanism and the cylindrical article in the first direction:

a conical cylindrical surface on said guide member for guiding the main body of the cylindrical article through the aperture in said guide member;

means for separating said guide jaws after the axially extending portion of the cylindrical article has entered the tubular member, so that the main body of the cylindrical article can pass through the aperture in said guide member; and means for maintaining said separating means operative as relative movement is caused between the guide mechanism and the cylindrical article in a reverse direction so that said guide jaws do not close on the main body of the cylindrical article.

10. Apparatus for welding a first portion of a coil spring to an article, wherein the first portion extends radially inward with respect to the coils adjacent a first end of the coils, and wherein the spring includes a second portion extending from the first portion substantially along the longitudinal axis of the coils of the spring beyond a second and opposite end of the coils, which apparatus comprises:

a first electrode;

means for supporting the coil spring and the article in welding position with the article and radially extending portion of the coil spring at the first end thereof in contact with one another and electrically connected to said first electrode;

a substantially tubular second electrode in which the axially extending portion of the coil spring is receivable with substantially no electrical contact between said tubular electrode and the axially extending portion, said tubular electrode being engageable with the radially extending portion of the coil spring to weld the radially extending portion to the article;

a stop member including first and second surface portions inclined with respect to one another at a substantial angle;

means for causing relative movement between said stop member and said support means in a first direction extending substantially parallel to the longitudinal axis of the coil spring to bring the first surface portion of said stop member into engagement with the end coil of the coil spring at the second end of the coils;

means for rotating the coil spring about its longitudinal axis relative to the article and to the first surface portion of said stop member so that an extremity of the end coil comes into engagement with the second surface portion of said stop member to limit the rotation of the coil spring and to locate the coil spring in a desired position relative to the article;

means for causing relative movement between said tubular electrode and said support means so that the axially extending portion of the coil spring is received in said tubular electrode and said tubular electrode contacts the radially extending portion of the located coil spring to weld the portion to the article; and means for causing relative movement between said tubular electrode and said support means, and between said stop member and said support means in a second direction opposite to the first direction, so that the welded coil spring and article can be removed from welding position.

11. Apparatus for welding a first portion of a coil spring to an article, wherein the first portion extends radially inward with respect to the coils adjacent a first end of the coils and wherein the spring includes a second portion extending from the radially extending first portion substantially along the longitudinal axis of the coils of the spring beyond a second and opposite end of the coils, which apparatus comprises:

a first electrode;

indexing support means for moving the coil spring and the article into and out of welding position, the article and the radially extending portion of the coil spring at the first end thereof, when in welding position, being in contact with one another and being electrically connected to said first electrode;

a substantially tubular second electrode in which the axially extending portion of the coil spring is receivable with substantially no electrical contact between said tubular electrode and the axially extending portion, said tubular electrode being engageable with the radially extending portion of the coil spring to weld the radially extending portion to the article;

a guide mechanism;

means for causing relative movement between said guide mechanism and said support means so that said guide mechanism guides the axially extending portion of the coil spring into said tubular electrode and guides the coils of the spring into axial alignment with said tubular electrode;

a stop member including first and second surface portions inclined with respect to one another at a substantial angle;

means for causing relative movement between said stop member and said support means in a first direction extending substantially parallel to the longitudinal axis of the coil spring to bring the first surface portion of said stop member into engagement with the end coil of the coil spring at the second end of the coils after the axially extending portion of the coil spring has been guided into said tubular electrode by said guide mechanism and the coils of the coil spring have been guided into axial alignment with said tubular electrode by said guide mechanism;

means for rotating the coil spring about its longitudinal axis relative to the article and to the first surface portion of said stop member so that an extremity of the end coil comes into engagement with the second surface portion of said stop member to limit the rotation of the coil spring and to locate the coil spring in a desired position relative to the article;

means for causing relative movement between said tubular electrode and said support means so that said tubular electrode, with the axially extending portion of the located coil spring received therein, contacts the radially extending portion of the located coil spring to weld the portion to the article; and means for causing relative movement between said tubular electrode and said support means, between said guide mechanism and said support means, and between said stop member and said support means in a second direction opposite to the first direction, so that said support means can be indexed to move the welded coil spring and article out of welding position.

References Cited

UNITED STATES PATENTS

| | | | |
|---|---|---|---|
| 2,263,740 | 11/1941 | Sample | 219—78 |
| 2,606,268 | 8/1952 | Pitko et. al. | 219—107 |
| 2,797,303 | 6/1957 | Kershaw | 219—78 X |
| 2,799,871 | 7/1957 | Torosian | 10—130 X |
| 2,947,445 | 8/1960 | Potter | 221—251 X |
| 3,072,778 | 1/1963 | Cook | 219—78 |
| 3,170,059 | 2/1965 | De Mose | 219—80 |
| 3,248,789 | 5/1966 | Seaman | 29—421 X |
| 3,294,948 | 12/1966 | Fagley et al. | 219—78 |

RICHARD M. WOOD, *Primary Examiner.*

B. A. STEIN, *Assistant Examiner.*

UNITED STATES PATENT OFFICE
CERTIFICATE OF CORRECTION

Patent No. 3,368,055                      February 6, 1968

Gary G. Seaman et al.

It is certified that error appears in the above identified patent and that said Letters Patent are hereby corrected as shown below:

Column 5, line 63, for "uper" read -- upper --; column 14, line 4, for "top" read -- stop --; column 15, line 35, for the claim reference numeral "17" read -- 7 --.

Signed and sealed this 24th day of June 1969.

(SEAL)
Attest:

Edward M. Fletcher, Jr.                    WILLIAM E. SCHUYLER, JR.
Attesting Officer                           Commissioner of Patents